United States Patent [19]

Sliva et al.

[11] 3,899,574

[45] Aug. 12, 1975

[54] METHOD FOR MAKING GRAPHITE FIBER AND RIBBON

[75] Inventors: Daniel E. Sliva, Pittsfield, Mass.; Charles M. Krutchen; Ray W. Shade, both of Elnora, N.Y.

[73] Assignee: General Electric Company, Schenectady, N.Y.

[22] Filed: Apr. 20, 1973

[21] Appl. No.: 352,922

Related U.S. Application Data

[63] Continuation-in-part of Ser. No. 86,295, Nov. 2, 1970, abandoned.

[52] U.S. Cl. ................................ 423/447; 264/29
[51] Int. Cl.² ................. C01B 31/02; C01B 31/04; C01B 31/07
[58] Field of Search ....... 423/445, 447, 449; 264/29, 264/176 F; 260/80 L, 94.1, 88.2 C, 88.2 D, 47 UA, 33.6 UA

[56] References Cited
UNITED STATES PATENTS

| | | | |
|---|---|---|---|
| 2,697,028 | 12/1954 | Baker et al. | 423/449 |
| 3,300,456 | 1/1967 | Hay | 260/88.2 D |
| 3,332,916 | 7/1967 | Hay | 260/80 L |
| 3,392,216 | 7/1968 | Otani | 423/447 X |
| 3,519,611 | 7/1970 | Hay | 260/94.1 |
| 3,533,743 | 10/1970 | Prescott et al. | 423/447 |
| 3,552,923 | 1/1971 | Carpenter et al. | 423/447 |
| 3,635,675 | 1/1972 | Ezekiel | 423/447 |
| 3,749,700 | 7/1973 | Stephens et al. | 260/80 P |
| 3,816,374 | 6/1974 | White | 260/47 UA |

FOREIGN PATENTS OR APPLICATIONS

| | | | |
|---|---|---|---|
| 1,557,383 | 2/1969 | France | 423/449 |
| 790,509 | 7/1968 | Canada | 423/447 |

OTHER PUBLICATIONS

"Man–Made Fibers Science and Technology", Edited by Mark et al., Vol. 1, 1967, pages 133–137.

*Primary Examiner*—Edward J. Meros
*Attorney, Agent, or Firm*—William A. Teoli; Joseph T. Cohen; Jerome C. Squillaro

[57] ABSTRACT

High strength graphite fiber or ribbon and a method for making them are provided involving the extrusion of a mixture of polyacetylene and an organic solvent, subjecting the extrudate to a preliminary heat treatment, and thereafter exposing the heat stabilized extrudate to temperatures up to about 3300°C while in an inert atmosphere and under tension.

7 Claims, No Drawings

METHOD FOR MAKING GRAPHITE FIBER AND RIBBON

This application is a continuation-in-part of my co-pending application Ser. No. 86,295, filed Nov. 2, 1970, now abandoned, and assigned to the same assignee as the present invention. All subject matter deleted from Ser. No. 86,295 is incorporated herein by reference.

The present invention relates to a method for making high strength graphite fiber, ribbon, and to large diameter linear graphite made from extruded polyacetylene.

Prior to the present invention graphite fiber was made by carbonizing synthetic organic fibers, such as polyacrylonitrile, as shown by Johnson, et al., U.S. Pat. No. 3,412,062. Although synthetic organic polymers, such as polyacrylonitrile provide an existing fiber structure which can be carbonized, these fibers have to be carefully pre-treated prior to carbonization to achieve optimum results. For example, a preliminary oxidationn treatment is required as shown by Johnson et al., U.S. Pat. No. 3,412,062 to minimize flaws and optimize the properties of the resulting carbon fibers. This preliminary oxidation treatment is needed to maintain fiber characteristics and minimize changes in fiber structure resulting from polymer breakdown at elevated temperatures. As a result of the extreme conditions used in this preliminary stabilization treatment, considerable polymer weight loss can occur during the oxidation period, which can be as long as 50 hours in an oxidizing atmosphere at temperatures over 200°C. Polymer weight loss can include both non-carbonaceous material and a significant level of carbon values, which precludes the production of carbon fiber representing the theoretical weight percent of carbon in the original organic polymer.

Recent synthetic fibers such as polybenzimidazoles have provided graphite after a considerably shorter stabilization treatment prior to graphitization. However, the graphite fiber formed from such organic fibers has a relatively low tensile strength psi, such as below 150,000 psi, and a modulus of elasticity of only about 30,000,000 psi or below.

The present invention is based on the discovery that polyacetylene extrudate can be heat stabilized and thereafter stress graphitized to produce high strength graphite fiber and ribbon. As utilized hereinafter the term "high strength" graphite or ribbon signifies a tensile strength of at least 200,000 psi and an elastic modulus of at least $40 \times 16^6$ psi. Surprisingly, the conversion of the extruded polyacetylene to high strength graphite filaments can be achieved in an inert atmosphere in less than five minutes or even a few seconds or less, if desired, with as little as 4% weight loss based on the initial weight of polyacetylene. A further advantage achieved with using polyacetylenes, is the capability of providing valuable graphite fiber having a diameter of from about 1 to about 6 mils and ribbons having an aspect ratio of at least 4 and an elastic modulus of at least 20,000,000 psi.

When employed hereinafter in the description of the present invention, the term "carbonization" or "carbonized" will signify the thermal conversion of organic polymer to the carbonaceous state resulting from the loss of chemically-combined atoms other than carbon, such as hydrogen, oxygen, sulfur, nitrogen or mixtures thereof, graphitization will signify the thermal conversion of a carbonized polymer under tension to the graphitized state. The carbonization and graphitization of the polyacetylene can occur in a step-wise manner.

The advantages achieved in the practice of the invention reside in the ability to stabilize polyacetylenes by a simple preliminary heat treatment in the presence or absence of oxygen. As previously indicated, unlike polymers shown in U.S. Pat. No. 3,412,062, the polyacetylenes do not require exposure to an oxidizing atmosphere over extended heating periods leading to extensive polymer weight loss. Surprisingly, it hass been found that polyacetylene extrudate when initially extruded in accordance with the practice of the invention, can be heat stabilized by exposure to temperatures above 100°C and as high as 1000°C without effecting explosive decomposition of the polymer due to rearrangement of $-C \equiv C-$. Those skilled in the art know, for example, that polyacetylene can decompose with explosive violence at temperatures as low as 180°C in particular instances. When the polyacetylene extrudate has been sufficiently heat cured in accordance with the invention, it can be safely exposed to temperatures as high as 3300°C while under tension to convert it to the high strength graphite or ribbon.

There is provided by the present invention a method for making graphite fiber or ribbon which comprises (1) melt extruding polyacetylene at a temperature in the range of up to about 180°C, (2) exposing the extruded polyacetylene to a temperature of up to about 1000°C to produce a heat stabilized extrudate having an elastic modulus greater than the extrudate of (1) and up to about $10 \times 10^6$ psi, and (3) thereafter exposing the heat stabilized extrudate of (2), while under a tension of up to about $1 \times 10^5$ psi, to a temperature of up to about 3300°C to produce a graphite fiber or ribbon having a density of up to about 2.0 g/cm$^3$ and an elastic modulus of at least $20 \times 10^6$ psi.

The polyacetylenes which can be employed in the practice of the invention contain chemically combined $-C \equiv C-$ radicals and can consist essentially of chemically combined carbon atoms and hydrogen atoms, or chemically combined carbon atoms, hydrogen atoms, and oxygen atoms, and in particular instances, in addition to the aforementioned atoms, chemically combined sulfur atoms, nitrogen atoms, and mixtures thereof.

Included by the polyacetylenes which can be utilized in the practice of the invention, are polymers containing in addition to $-C \equiv C-$ radicals, divalent radicals derived from diethynyl aromatic compounds, such as diethynyl benzene. More particularly, the polyacetylenes useful in the practice of the invention, can be derived by the oxidative coupling of diethynyl organo compounds such as meta-diethynylbenzene (MDEB) and para-diethynylbenzene (PDEB). Further the polyacetylenes can contain chemically combined dipropargyl ether units of various dihydric phenols in combination with MDEB and PDEB units. Some of the dihydric dipropargyl ethers which can be employed are preferably ethers of bisphenol-A and dihydric phenols shown in Vaughn U.S. Pat. No. 3,419,634 assigned to the same assignee as the present invention.

The polyacetylenes also can include MDEB units and PDEB units in further combination with diethynylalkane units of $C_{(2-8)}$ alkanes such as 1,2-diethynyl ethane, 1,4-diethynyl butane, etc.

Preferably, the polyacetylene extrudate is made by melt extruding blends of polyacetylene described in copending application of Charles M. Krutchen, Ser. No. 352,923 filed Apr. 20, 1973, now U.S. Pat. No. 3,852,235, and assigned to the same assignee as the present invention. These blends are melt extrudable at temperatures of from 100°C to 180°C, and preferably 120°C to 150°C, comprising by weight (A) from 20 to 50% by weight of polyacetylene having an intrinsic viscosity of 0.5 to 1.5 in ortho-dichlorobenzene at 120°C, and (B) from 80 to 50% of organic solvent where said blends can be in the form of a free flowing powder, a wet granulated mixture or paste.

The polyacetylenes which can be employed to produce the above melt extrudable blends are preferably selected from a. copolymers of 88 to 92 mole percent of MDEB units and 8 to 12 mole percent of PDEB units, b. terpolymers consisting essentially of
  i. 85 to 92 mole percent of MDEB units,
  ii. 4 to 10 mole percent of PDEB units,
  iii. 2 to 6 mole percent of bisphenol dipropargyl ether units, where the sum of (i), (ii) and (iii) units in (b) is 100 mole percent.

c. terpolymers consisting essentially of
  iv. 74 to 86 mole percent of MDEB units,
  v. 4 to 9 mole percent of PDEB units,
  vi. 5 to 15 mole percent of diethynylalkane units, where the sum of (iv), (v) and (vi) units in (c) is 100 mole percent, and d. tetrapolymer consisting essentially of about 5% by weight of acetylene units, and 95% by weight of (b) or (c), based on the total weight of tetrapolymer.

Organic solvents, or "plasticizers" which can be employed in combination with the polyacetylenes to produce the melt extrudable polyacetylene-plasticizer blends in accordance with the practice of the invention, are any organic liquids which are inert to the polyacetylene while functioning as a plasticizer during extrusion. An organic solvent functions as a plasticizer within the meaning of the present invention, if it facilitates the extrusion of the polyacetylene-plasticizer blend. Suitable plasticizers are, for example, para-dichlorobenzene, ortho-dichlorobenzene, nitrobenzene, and halogenated aryl hydrocarbons, such as Aroclors having an average weight percent of chlorine from about 12 to 75 percent, based on total weight of halogen, carbon and hydrogen.

The plasticizer and polyacetylene can be blended to a uniform free flowing powder or paste with a standard blender such as a Patterson-Kelly V-blender, Henschel Mill, etc. Blending is preferably done immediately prior to extruding the polyacetylene to avoid excessive separation of plasticizer from polyacetylene.

The blend can be heated to a temperature between 100°C to 180°C to render it sufficiently plastic to facilitate the extrusion of the polyacetylene. Satisfactory extrusion results can be achieved with orifices of from 1 to 100 mils diameter. The extrudate can be allowed to fall freely, or it can be collected onto a spool and allowed to cool to room temperatures before being further processed.

While the polyacetylene is being extruded, a suitable fiber tension can be imposed on the extrudate to "melt-draw" the extrudate down to diameters less than that of the die orifice from which the blend is extruded. In accordance with standard extrusion techniques, the RPM of the take-up spool, for example, is coordinated with the polymer delivery through the orifice to accomplish this regulation of diameter.

After extrusion, the polyacetylene extrudate can be subjected to further processing steps prior to the stabilizing heat treatment. These steps can include, for example, (1) drawing of the extrudate to accomplish an increase in tensile properties and a decrease in diameter, and (2) full or partial removal of plasticizer by use of heat or extractive solvent. For example, the extrudate can be spun under tension directly through a heating zone at temperatures up to about 500°C to simultaneously effect the removal of plasticizer and heat stabilization of the polymer.

Experience has shown that sudden heating of polyacetylene extrudate to temperatures above 180°C, or use of an open flame having surface temperature of greater than 700°C, particularly when employing polyacetylene extrudate free of plasticizer, can result in explosive decomposition, or burning of the fiber. However, if the fiber is properly heat stabilized or a sufficient number of $-C \equiv C-$ radicals are cross-linked, the fiber can be exposed to temperatures up to 3300°C without substantial loss of fiber integrity.

Heat stabilization of the fiber can be achieved by exposing the fiber to temperatures up to about 1000°C for a time sufficient to increase the modulus of elasticity of the extrudate at least $1 \times 10^6$ psi. The polyacetylene extrudate, for example, can have an elastic modulus of from about $1 \times 10^3$ psi to about $1 \times 10^4$ psi. The heat stabilized fiber can have an elastic modulus of from about $1 \times 10^6$ psi to about $10 \times 10^6$ psi. Stabilization of the fiber is believed to relate to a control of the rearrangement of $-C \equiv C-$ radicals. Control is accomplished by either (1) low temperature (100°-200°C) heat treatment for long periods of time, (2) sequential treatments at increasing temperatures for shorter periods of time, or (3) flash exposure of the fiber to temperatures up to about 1000°C. For example, heat stabilization of a 1 mil polyacetylene extrudate can be achieved by exposing the extrudate 16 hours at 160°C, or passing it over a hot pin at 310°C for about 0.5 seconds and then through ovens at 200°C and 300°C for 20 seconds. These heat treatments can be conducted either in the presence or absence of oxygen, i.e., in air, vacuum or in an inert gas atmosphere such as argon or nitrogen.

Unlike polymers shown in U.S. Pat. No. 3,412,062, polyacetylenes do not require a separate carbonization step prior to stress graphitization. Because weight losses due to carbonization can be minimal, diffusion problems can be avoided. This allows for the simultaneous carbonization and graphitization of the polyacetylene fiber. Although after it has been heat stabilized, the polyacetylene extrudate can be advanced to temperatures up to about 3300°C, while under tension, to graphitize the extrudate, if desired the extrudate can be carbonized. As an intermediate step prior to graphitization, carbonization can be achieved at temperatures between about 600°C to about 1500°C in a non-oxidizing atmosphere. As previously defined, carbonization indicates conversion of the polyacetylene extrudate to a product substantially free of all atoms, except carbon. Graphitization of the polyacetylene extrudate can be achieved by advancing the heat stabilized extrudate, while under tension in the absence of oxygen, such as by use of an inert atmosphere, employing a noble gas, vacuum, etc. to a temperature in the range of from 2000°C to 3200°C. A tension from about 3000 psi to about $1 \times 10^5$ psi, and preferably 10,000 psi to 15,000 psi can be employed. Depending upon the temperature employed during graphitization, the residence time of the stabilized extrudate in the heating zone can vary from about 15 seconds or less, to about 360 seconds or more. During the graphitization step, the extrudate can be elongated from up to about 25 to 100% or more. As a result of the stress graphitization, a graphite fiber or ribbon can be made which can have a tensile strength of at least 25,000 psi or more, a tensile modulus of at least $20 \times 10^6$ psi or more, and a density of about 1.5 to 2.0 gm/cm³.

Graphite fiber having a diameter of from 0.3 to 6 mils or graphite ribbon having a thickness of 0.3 to 6 mils made in accordance with the method of the invention, can be employed in combination with various curable organic resins, or solutions thereof to produce resin prepregs. Organic resins, which can be employed, for example, are curable polyimides, as shown by French Pat. No. 1,555,564, U.S. Pat. No. 3,528,950, etc. In addition, there can be employed epoxy resins, copolymers of vinylene-fluoride and hexafluoropropylene, phenylquinoxalines, polycarbonates, etc.

In instances where the above described prepregs are made with large diameter graphite fiber or ribbon, for example, having a diameter of from 1 to 6 mil, composites can be made having superior compressive and impact strength as compared to conventional composites reinforced with linear graphite having about 0.3 mil diameter. In addition, optimum carbon-metal interaction is provided by large diameter graphite fiber or ribbon as compared to graphite having a diameter of 0.3 mil or less. Advantages in fiber or ribbon alignment and placement in primary construction elements also are provided. Weight advantages also are achieved with large diameter filaments since less surface area is exposed.

In order that those skilled in the art will be better able to practice the invention, the following examples are given by way of illustration and not by limitation. All parts are by weight.

EXAMPLE 1

A polyacetylene utilized in the practice of the invention was prepared by adding 0.15 part of dipropargyl ether of 2,2-bis(4-hydroxyphenyl)propane, 4.61 parts of meta-diethynylbenzene and 0.24 part of para-diethynylbenzene to a mixture of about 0.75 part of cuprous chloride and about 1.5 parts of N,N,N′,N′-tetramethylethylenediamine dissolved in an oxygenated solution of about 8 parts of pyridine and about 58 parts of ortho-dichlorobenzene at 60°C. Upon the addition of the aforementioned acetylenic compounds, the temperature of the resulting mixture rose to 85°C within 3 minutes and the solution became too thick to stir. After 20 minutes, the mixture was cooled to room temperature and added to methanol containing a trace of hydrochloric acid. Based on method of preparation, there was obtained a polyacetylene consisting essentially of chemically combined meta-diethynylbenzene (MDEB) units, para-diethynylbenzene (PDEB) units, and organo ether unts having terminal ethynyl radicals such as dipropargyl bisphenol ether units. The polymer was washed with methanol and dried at 40°C in vacuo. The yield of the polyacetylene was about 5 parts and its intrinsic viscosity in ortho-dichlorobenzene was 1.02 dl/g at 120°C.

A blend was prepared in a mortar and pestle consisting of about 2.6 parts of ortho-dichlorobenzene and 1 part of the above polyacetylene. Compatibility was established using a Fisher-Johns melting point apparatus shown on p. 640 of Fisher Catalog, 70. The sample was placed between two glass plates. The plates were heated rapidly (up to 1 minute) to a temperature between 100°C to 150°C while applying a pressure of between 100 psi to 1,000 psi.

A clear melt was obtained; the blend was extrudable. The above blend was heated to the plastic state at 125°C and extruded through a 3 mil die hole. The extrudate was allowed to fall freely about 4 feet onto a paper substrate. The extrudate was found to have a diameter of about 2½ to 3 mils and elastic modulus of about 2,000 psi. The extruded fiber was heat stabilized by initially drawing it 450% and passing it over a 0.25 inch diameter hot pin maintained at 125°C and protected with a nitrogen atmosphere. The filament was collected at a rate of about 55 feet per minute. The filament was then passed over the hot pin at temperatures of 310°C protected with nitrogen at a take-up rate of 2 feet per minute. The filament was further passed twice through a heating zone at 200°C at a rate of 6 feet per minute under a load of 1 gram. The filament was then passed twice through a 300°C heating zone utilizing a nitrogen atmosphere at a rate of 6 feet per minute under a load of 1 gram. Total time for heat stabilizing the fiber is less than 5 minutes. The resulting polyacetylene fiber is 1.0 to 1.25 mils in diameter and has a tensile strength of 30,000 psi to 60,000 psi, and an elastic modulus of $2.5 \times 10^6$ psi. Elemental analysis shows that it contains about 88% carbon.

The above filament was then loaded to a stress level of 4000 to 14,000 psi and then passed through an argon atmosphere at temperatures in the range of from about 2500°C to 3000°C in an induction furnace. A residence time of the fiber in the heating zone while under stress in an argon atmosphere was about 6 minutes. There was obtained a high strength graphite fiber having a tensile strength of $330 \times 10^3$ psi and an elastic modulus of $56 \times 10^6$. The density of the fiber was found to be about 2.0 grams per cubic centimeter.

EXAMPLE 2

A polyacetylene copolymer is prepared utilizing a mixture of MDEB and PDEB. Copolymerization is achieved by oxidative coupling utilizing as a catalyst a mixture of cuprous chloride, N,N,N′,N′-tetramethylethylenediamine and a solvent system of dichlorobenzene and pyridine. Based on method of preparation, there is obtained a polyacetylene having about 88 mole percent of MDEB units and about 12 mole percent of PDEB units.

A powdery blend is prepared in a mortar and pestle utilizing about two parts of ortho-dichlorobenzene per part of the above polyacetylene. The resulting blend is extruded through a 5 mil orifice at 135°C. The extrudate is found to have an elastic modulus of about 2,000 psi, and a diameter of about 2.8 mil. The extrudate is then drawn over a hot pin at 185°C to a 1.25 mil diameter which is collected at a rate of about 55 feet per minute, under atmospheric conditions. The resulting heat treated extrudate is further heat treated by passing the drawn filament over 10 inches long hot shoes at 260°C, at 360°C, at a rate of about 6 feet per minute under atmospheric conditions. Total time for heat stabilization is less than 5 minutes. The resulting heat treated fiber is found to have an elastic modulus of about $2.5 \times 10^6$ psi.

The heat treated fiber is then passed through an induction furnace under a stress of about 14,000 psi using and utilizing an argon atmosphere at a temperature of about 3,000°C. After an exposure of about 6 minutes, there is obtained a high strength graphite fiber having a tensile strength of about $250 \times 10^3$ psi and an elastic modulus of about $50 \times 10^6$ psi.

EXAMPLE 3

A terpolymer is made in accordance with Example 1, having an intrinsic in ortho-dichlorobenzene of about 0.65. It is blended with 2.5 parts of solvent, per part of polymer. An extrudate is formed at 125°C through a 20 mil die.

The extrudate is drawn to $4 \times$ its length at 180°C and thereafter extracted with methanol. It is dried under vacuum for 16 hours and thereafter heat treated in air without tension for 2 hours at 150°C, 5 minutes at 350°C and 2 minutes at 800°C.

The resulting heat treated extrudate is stress graphitized at 3000°C in accordance with the practice of the invention. There is obtained a graphite fiber having an average diameter of 5.1 mils, a tensile strength of 54,000 psi, and tensile modulus of $22 \times 10^6$ psi.

EXAMPLE 4

The blend of Example 3 is extruded through a $3 \times 300$ mil die. The extrudate is drawn to about $4 \times$ its length at a temperature up to 180°C. The resulting extruded ribbon is then heat treated by passing over a 10 inch hot shoe 30 seconds at 240°C, 30 seconds at 300°C and 30 seconds at 350°C. The heat treated ribbon is then carbonized in nitrogen for 30 seconds at 1,000°C.

The carbonized ribbon is then stress graphitized at 3,000°C in accordance with the practice of the invention. There is obtained a graphite ribbon having a cross-section of $0.3 \times 33$ mils, a tensile strength of 173,000 psi and a tensile modulus of $24 \times 10^6$ psi.

EXAMPLE 5

A solution of 0.5 part of 1,7-octadiyne, 4.2 parts of MDEB and 0.3 part of PDEB in 25 parts of ortho-dichlorobenzene was added to a solution of 0.15 part of cuprous chloride, about 0.23 part of N,N,N',N'-tetramethyl-1,2-ethylene diamine and about 1.7 parts of pyridine, in about 75 parts of ortho-dichlorobenzene, which was being oxygenated and stirred at 62½°C. The temperature of the mixture rose to about 88°C within 2 minutes and then gradually dropped. The mixture was stirred for 60 minutes and then poured into about 500 parts of methanol containing a trace of hydrochloric acid. The product which precipitated was collected on a filter and washed with additional methanol and dried at 25°C. There was obtained a 99% yield of product having an intrinsic viscosity of 0.50 dl/g at 120°C. Based on method of preparation, the product was polyacetylene terpolymer composed essentially of 12 mole percent of octadiynyl units, 82 mole percent of MDEB units, and 6 mole percent of PDEB units.

Several additional alkylene terpolymers were made following the same procedure to determine the optimum mole percent ranges of ethynyl units for plasticizer compatibility. Compatibility can be determined by using the procedure of Example 1. It is found that optimum compatibility in ortho-dichlorobenzene is a terpolymer having 15 mole percent of alkane diethynyl units, 76 mole percent of MDEB units, and 8 mole percent of PDEB units.

Free flowing powdery blends are prepared from the above terpolymers with ortho-dichlorobenzene using the procedure of Example 1. The blends are extruded and graphitized. High strength graphite is obtained useful from making composites.

EXAMPLE 6

There was added a solution of 4.23 parts of MDEB, 0.27 part of PDEB, 0.50 part of the dipropargyl ether of bisphenol-A in ortho-dichlorobenzene to an oxygenated mixture of 0.15 part of cuprous chloride, 0.17 part of tetramethylethylenediamine, about 1.7 part of pyridine, and approximately 60 parts of ortho-dichlorobenzene. Oxygenation of the mixture was achieved by bubbling oxygen into the solvent at a rate of about 0.5 cubic feet per hour, per mole of ethynyl compound. There was then bubbled into the mixture 0.28 part of acetylene over a 2 minute period. The reaction temperature rose steadily from an initial bath temperature of about 61°C to about 80.5°C, and then gradually dropped. External heating was removed after about 6 minutes, after which time the oxygenation of the mixture was discontinued. The product began to precipitate upon cooling. The mixture was added to excess methanol acidified with hydrochloric acid to effect the precipitation of product. Recovery of the product was achieved by a standard extraction technique, followed by washing with methanol. Based on method of preparation, the product was a polyacetylene having about 95% by weight of diethynyl units consisting of 4 mole percent of chemically combined dipropargyl bisphenol-A ether units, 9 mole percent of PDEB units, 87 mole percent of MDEB units, and about 5% by weight of additional acetylene units based on the weight of polyacetylene. The product had an intrinsic viscosity of dichlorobenzene at 120°C of 1.12 dl/g. It formed a clear film when tested for plasticizer compatibility by the test described in Example 5.

The above polyacetylene tetrapolymer is blended with nitrobenzene to produce a mixture having up to 50% by weight solvent. It is extruded through a 30 mil die at 135°C. The resulting extrudate is used to make high strength graphite fiber in accordance with the method of the invention.

EXAMPLE 7

A bundle of about 20 graphitized carbon fibers, made in accordance with Example 1, having an average diameter of about 0.8 mil and a length of about 6 inches is clamped in a horizontal position. The bundle is then treated with a 10% solution of an epoxy resin in methylethyl ketone employing a micro pipette. The treated fibers are then placed into an oven at 60°c for 45 seconds to effect the evaporation of the solvent. There is obtained a prepreg which is cut into 1½ pieces. The epoxy resin employed contains as essential ingredients, a bisphenol epichlorohydrin reaction product, and a methyl Nadicanhydride curing agent.

The above 1½ prepregs are put into a cold mold and cured under 600 psi for 1 hour at 150°C, and 16 hours at 175°C in an air oven. There is obtained a composite exhibiting valuable characteristics and useful for making high strength laminates and molded parts.

EXAMPLE 8

A composite is made in accordance with Example 7, using polyacetylene graphite fiber having an average diameter of 1 mil and a tensile modulus of $60 \times 10^6$ psi in place of the 0.8 mil fiber. Another composite is made following the same procedure using 0.3 mil Modmor I graphite fiber made commercially from polyacrylonitrile.

The two composites are subjected to a Charpy impact test. It is found that the composite having the 1 mil diameter graphite has a Charpy impact value of 2.1 ft/lbs, while the composite containing the 0.3 mil diameter commercially available fiber has a Charpy value of 0.5 ft/lbs.

Based upon the above examples, those skilled in the art would know that graphite fiber and ribbon produced in accordance with the method of the present invention, can be employed in a variety of applications requiring the services of a high strength, high modulus material such as in making composite, laminates, prepregs convertible to the cured state, etc.

The graphite ribbon made in accordance with the invention can be more particularly described as having an aspect ratio of between about 4 to about 2,000. The term "aspect ratio" by the relation W/T, where W is width and T is thickness. The graphite ribbon of the present invention can have a thickness of from 0.2 to 1 mil or higher and a tensile of at least 150,000 psi and an elastic modulus of 20,000,000 psi.

Although the above examples are limited to only a few of the very many variables which can be employed in the practice of the present invention, it should be understood that the present invention is directed to the use of a much broader class of polyacetylene polymers and organic solvents which can be extruded and crosslinked and converted to the high strength, high modulus state. For example, based on the melt extrusion procedure used in the present invention for polyacetylenes, there can be used copolymers of MDEB and PDEB where the PDEB can be present as high as 33 mole percent based on total moles of MDEB and PDEB.

What we claim as new and desire to secure by Letters Patent of the United States is

1. A method for making graphite fiber or ribbon which comprises
   1. melt extruding at a temperature in the range of up to about 150°C, a polyacetylene-organic solvent blend comprising by weight
      A. from 20 to 50% by weight of polyacetylene having an intrinsic viscosity of 0.5 to 1.5 in ortho-dichlorobenzene at 120°C,
      B. From 80 to 50% of organic solvent selected from the class consisting of para-dichlorobenzene, orthodichlorobenzene, nitrobenzene, and halogenated arylhydrocarbons having an average weight percent of chlorine from about 12 to 75 percent, based on total weight of halogen, carbon and hydrogen where said blend is in the form of a free flowing powder, a wet granulated mixture or paste to produce a polyacetylene fiber or ribbon, where said polyacetylene is a member selected from the class consisting of
         a. a copolymer consisting essentially of from 88 to 92 mole percent of chemically combined metadiethynylbenzene units and from 8 to 12 mole percent of para-diethynylbenzene units, and
         b. a terpolymer consisting essentially of from 85 to 92 mole percent of chemically combined metadiethynylbenzene units, 4 to 10 mole percent of para-diethynylbenzene units and 2 to 6 mole percent of dipropargyl ether units of a bisphenol,
   2. exposing the polyacetylene fiber or ribbon to a temperature of up to 1000°C to produce a heat treated fiber or ribbon having an elastic modulus greater than the extrudate of (1) and up to about $10 \times 10^6$ psi,
   3. thereafter exposing the heat treated fiber or ribbon of (2) while under a tension of up to $1 \times 10^5$ psi and under non-oxidizing conditions to a temperature of up to about 3300°C to produce a graphite fiber or ribbon having an elastic modulus of at least about $20 \times 10^6$ psi.

2. A method in accordance with claim 1, where a graphite fiber is made having an average diameter of from about 0.3 to 1 mil, a tensile strength of at least 200,000 psi, and an elastic modulus of at least 40,000,000 psi.

3. A method in accordance with claim 1, where the polyacetylene fiber or ribbon is exposed to a temperature of up to 1,000°C for 5 minutes or less to achieve an elastic modulus up to about $10 \times 10^6$ psi.

4. A method in accordance with claim 1, where the organic solvent is ortho-dichlorobenzene.

5. A method in accordance with claim 1, where the polyacetylene is a copolymer consisting essentially of chemically combined meta-diethynylbenzene units and paradiethynylbenzene units.

6. A method in accordance with claim 1, where the polyacetylene is a terpolymer consisting esentially of chemically combined meta-diethynylbenzene units, paradiethynylbenzene units and dipropargyl ether units of a bisphenol.

7. A method in accordance with claim 1, where a graphite ribbon is made having an aspect ration of at least 25.

* * * * *